United States Patent [19]

Brozovic et al.

[11] Patent Number: 4,681,651
[45] Date of Patent: Jul. 21, 1987

[54] VACUUM BAG SEALING SYSTEM

[75] Inventors: George R. Brozovic, Glendale; Michael O. Djobadze, LaCrescenta; Felix M. Navarrete, Arleta, all of Calif.

[73] Assignee: Lockheed Corporation, Calabasas, Calif.

[21] Appl. No.: 894,147

[22] Filed: Aug. 7, 1986

[51] Int. Cl.⁴ ............................................. B32B 31/20
[52] U.S. Cl. ..................................... 156/382; 156/104; 156/242; 156/245; 156/285; 156/286; 156/381
[58] Field of Search ............... 156/104, 242, 245, 285, 156/286, 306.3, 381, 382, 583.3, 583.8, 344, 584, 247; 428/69, 76, 421, 448, 451

[56] References Cited

U.S. PATENT DOCUMENTS

| 3,553,054 | 1/1971 | Maus | 156/382 |
| 4,016,022 | 4/1977 | Browning et al. | 156/285 |
| 4,216,047 | 8/1980 | Hilliard et al. | 156/285 |
| 4,284,679 | 8/1981 | Blad | 428/218 |
| 4,287,015 | 9/1981 | Danner, Jr. | 156/382 |
| 4,425,406 | 1/1984 | Palma | 156/104 |

Primary Examiner—Caleb Weston
Attorney, Agent, or Firm—Louis L. Dachs

[57] ABSTRACT

The invention is a vacuum bag sealing system for the manufacturing of composite structures and the like in a mold. In detail, the system comprises a base plate for mounting the mold. A first Teflon coated sealing surface is bonded to the base plate extending about the periphery of the mold. Also included is a vacuum bag, having a second Teflon coated sealing surface bonded thereto in a complimentary relationship to the first sealing surface when the vacuum bag is placed over the mold and base plate. A bead of conventional vacuum bag sealant is used to bond the first sealing surface to the second sealing surface so that an airtight seal is formed between the vacuum bag and the base plate.

14 Claims, 2 Drawing Figures

4,681,651

VACUUM BAG SEALING SYSTEM

TECHNICAL FIELD

The invention relates to the field of sealing systems and, in particular, to a vacuum bag sealing system for the manufacturing of composite structures.

BACKGROUND INFORMATION

Composite structures are used for a variety of applications on most aircraft such as wing planks, vertical and horizontal stabilizer skins, fuselage panels, and various other components. The composite structures are typically formed on a mold which is mounted on a base plate. Layers of composite material are impregnated with uncured resin and then laid up over the mold. A vacuum bag is then placed over the uncured composite material and sealed to the plate about the periphery. To cure the part, a vacuum is drawn from between the vacuum bag and the base plate. Subsequently, the assembly is placed in an autoclave where the temperature and pressure are raised to cure the resin. After curing, the assembly is returned to room temperature. The vacuum bag is then removed so that the cured part may be separated from the mold. U.S. Pat. No. 4,284,679 entitled "Filled Resin Coated Tape" by L. Blad describes another process by which composite structures may be formed. Here, strips of resin and syntactic resin are laid into grooves on the surface of a rubber coated mandrel. A set of female cylindrical tools is assembled around the mandrel. A vacuum bag enclosing the female tools is sealed to the rubber surface of the mandrel and a vacuum is drawn. The mandrel is then removed and the sealed structure is placed in an autoclave at 250° F., 100 psi for one hour to cause the resin to cure.

The construction of the vacuum bags used in the above-described processes is time consuming, expensive, and is unreliable unless skilled personnel are assigned to the task. The task is further complicated when the critical point of establishing the airtight seal is also the point of fastening. The requirement of the airtight seal limits both the types of fastening and vacuum bags that may be used. The most common bag material is nylon which is easily damaged so that it usually must be replaced after each cure cycle. Such a design is disclosed in U.S. Pat. No. 4,016,022, entitled "Low Flow, Vacuum Bag Curable Prepreg Material for High Performance Composite Systems". Here, the nylon vacuum bag is sealed to the base plate using a commercial sealant. Another vacuum bag design is disclosed in U.S. Pat. No. 3,553,054, entitled "Laminated Structural Members:" by Maus. A vacuum bag, of polymeric composition, is sealed to the base plate using a zinc-chromate tape adhesive. This type of seal is not reliable.

An alternative material used is silicone rubber. Silicone rubber has an elongation of 650% which makes it possible to stretch it over molds of various sizes and shapes; it can be exposed to a maximum temperature of 500° F. which allows greater curing cycle flexibility; and it is easily repairable which extends the service life. Unfortunately, great difficulty has been encountered in sealing the silicone rubber bag to the base plate using the above-described conventional techniques.

Another vacuum bag design is discussed in U.S. Pat. No. 4,287,015, entitled "Vacuum Bags Used in Making Laminated Products" by H. J. Danner. In this patent a vacuum bag is disclosed, which comprises a closed-loop ribbed structure bonded to a baseplate about a mold. A stretchable bag is placed over the entire structure and fastened to the base plate about the periphery of the ribbed structure. The bag has a zipper or velcro type fastener located around the periphery of the vacuum bag and the ribbed structure. Thus, when the bag is "unzipped" the structure to be formed can easily be laid on the mold. Prior to pulling a vacuum, the bag is zipped-up so that a seal is formed between the bag and ribbed structure. This method could be used with silicone rubber but it is an expensive system.

Other sealing techniques include the use of a peripheral groove on a plate into which a vacuum bag is forced. The vacuum bag is held in place by a tubular shaped, resilient material wedged into the groove. This type of seal, however, tends to leak. In addition, there is the expense of machining the groove. Another technique is to place a "picture frame" over the vacuum bag which may then be clamped to the base plate. This technique is subject to leakage, due to warpage of the picture frame, and adds the expense of construction of the picture frame. A final technique is to completely enclose the mold, composite, and base plate between upper and lower sheets of bag material and to seal the two sheets together with conventional bag sealant. This has the obvious disadvantage of doubling the amount of bag material required. Furthermore, if the part to be cured is large, the installation of the lower portion of the bag will be unwieldy.

Therefore, it is a primary object of the subject invention to provide a sealing system utilizing a reusable vacuum bag in the fabrication of composite structures.

It is another primary object of the subject invention to provide a sealing system so that conventional bag sealing methods can be used with silicone rubber bags.

It is a further object of the subject invention to provide a vacuum bag which is both easy to install and easy to remove after the part has been cured.

It is a still further object of the subject invention to provide an inexpensive vacuum bag sealing system.

DISCLOSURE OF THE INVENTION

The invention is a vacuum bag sealing system for use in the manufacturing of composite parts and, in particular, a sealing system that utilizes conventional bag sealing methods for sealing a silicone rubber vacuum bag to a base plate. In detail, the sealing system comprises a base plate upon which is mounted a mold. A first, Teflon TM coated, sealing surface is bonded to the periphery of the base plate. The first sealing surface is preferably a strip of fiberglass fabric, coated on one side with Teflon, and its ends are butted together forming a closed loop. The first sealing surface is bonded on its opposite side to the base plate. A second sealing surface, which is similar in construction to the first sealing surface, is bonded to the vacuum bag in a complimentary relationship to the first sealing surface when the vacuum bag is placed over the mold and base plate. The bonding agent for the first sealing surface is a pressure-sensitive adhesive, while the bonding agent for the second sealing surface is a silicone rubber adhesive.

If the mold is complex in shape, the vacuum bag is usually formed from a sheet of uncured silicone rubber. The uncured silicone rubber is draped over the mold and sealed with a vacuum bag. A vacuum is pulled by conventional techniques and the silicone rubber is cured under pressure and heat. During this cure cycle, the silicone rubber is forced against the mold and permanently takes on its shape. If the bag is formed in this manner, the second sealing surface can be joined directly to the bag in the same forming step.

The novel features which are believed to be characteristics of the invention, both as to its organization and methods of operation, together with further objects and advantages thereof, will be better understood from the following descriptions in connection with the accompanying drawings in which the presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

Illustrated in FIG. 1 is a broken away perspective view of a composite structure forming apparatus using the subject vacuum bag sealing system.

Illustrated in FIG. 2 is an enlarged view of a portion of the forming tool showing in detail the vacuum bag seal.

BEST MODE FOR CARRYING OUT THE INVENTION

Figure 1:
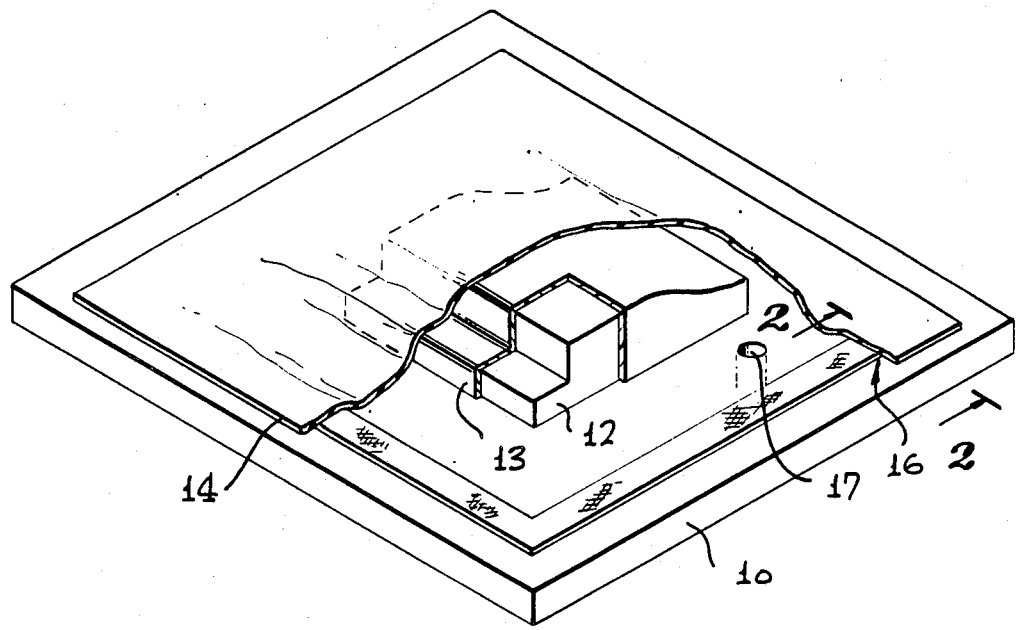

Illustrated in FIG. 1 is a broken away perspective view of a typical composite structure forming apparatus. A solid surface is depicted in the form of a base plate 10, preferably made of aluminum. Although the base plate 10 is shown as a flat rectangle, it may have a complex, three dimensional contour. Mounted on the base plate 10 is an irregularly shaped mold 12 in the shape of the composite structure to be formed. Laid over the mold 12 is one or more sheets 13 of composite material, typically filamentary material impregnated with uncured resin. Additionally, bleeder and/or breather cloth (not shown) is used as required. Over the sheets 13 and mold 12 is a vacuum hag 14, preferably made of silicone rubber, which is bonded to the base plate 10 so that a vacuum may be drawn through a port 17. Typically, the silicone rubber is 0.060 to 0.090 inch thick sheet stock.

Figure 2:
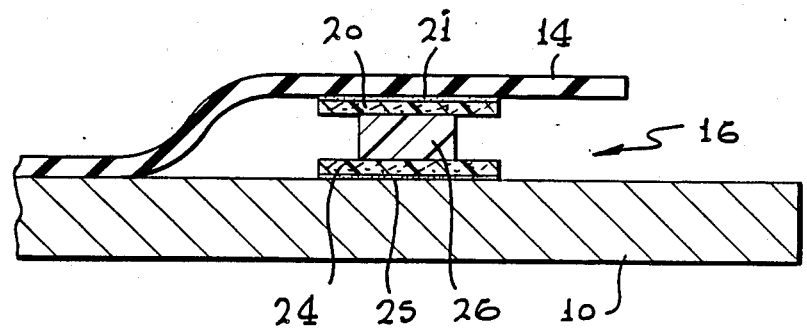

Still referring to FIG. 1, and additionally to FIG. 2 which is an enlarged view of a seal assembly 16, it can be seen that the vacuum bag 14 extends sufficiently beyond the mold 12, where it is joined to the base plate 10 by means of the seal assembly 16. The seal assembly 16 comprises a strip of fiberglass fabric 20, preferably 5 mil. in thickness, coated on one side with Teflon, bonded by an adhesive 21 to the vacuum bag 14. Another strip of Teflon coated fiberglass fabric 24, or Teflon pressure-sensitive tape, also preferably 5 mil. in thickness, is bonded to the base plate 10 by an adhesive 25. The adhesive 21 is a silicone rubber adhesive such as No. RTV 102 or 157 made by General Electric, Waterford, N.Y., which can be used for cure temperatures of up to 450° F. The adhesive 25 can be an acrylic pressure-sensitive adhesive used for temperatures of up to 290° F. or a silicone rubber adhesive used for temperatures of up to 450° F. In either case, the strips of fiberglass fabric 20 and 24 can be fabricated with either of the two adhesives mentioned above. Between the strips of fiberglass fabric 20 and 24 is a bead of conventional bag sealant 26, preferably a silicone rubber adhesive such as No. 9151 made by Schne Morehead Chemicals, Los Angeles, Calif.

Prior to assembling the sealing system, that portion of the base plate 10 which forms the bond is roughed up a bit with an emery cloth (240 grit) after which it is cleaned with a solvent. The non-Teflon coated side of the fiberglass fabric 24 is bonded to the base plate 10 with the pressure-sensitive adhesive 25. The ends of the fiberglass fabric 24 are butted together forming a closed loop. During the cure of the fiberglass fabric 20 to the vacuum bag 14, the bag is first wiped clean with a solvent. The adhesive 21 is applied to both the vacuum bag 14 and the fiberglass fabric 20 and the ends are then butt joined.

Alternately, the fiberglass fabric 20 can be bonded directly to the vacuum bag 14. When the composite part to be formed is complex in shape, the vacuum bag 14 is shaped on the mold 12. This is accomplished by placing an uncured silicone rubber sheet over the mold 12, vacuum bagging by conventional techniques, pulling a vacuum, and then heat curing it in place. This causes the silicone rubber sheet to soften and conform to the mold 12 as it cures. Thus, if the fiberglass fabric 20 is placed about the periphery of the vacuum hag 14 with the non-Teflon coated side in contact with the vacuum bag 14 prior to curing, it will become automatically bonded thereto as the vacuum bag 14 cures. Forming the vacuum bag 14 in this way reduces stretching during the subsequent molding of composite parts on the mold 12 since the vacuum bag 14 already closely conforms in shape.

The making of the composite parts is conventional. Uncured sheets of composite material 13, and if required bleeder cloth and/or breather cloth (not shown), are laid up over the mold 12. The vacuum bag 14 is placed over the mold 12 so that the fiberglass fabric 24 is aligned with the fiberglass fabric 20. Thereafter, the sealing surfaces are locally separated and a bead of sealant 26 is laid up on the fibergalss fabric 24. Alternately, a bead of sealant 26 can be placed on the fiberglass fabric 24 prior to the positioning of the vacuum bag 14. This requires care so that the sealing surfaces are aligned without dislodging the bead of sealant 26. Hand pressure is used to bring the fiberglass fabrics 20 and 24 in contact with the bead of sealant 26 thereby effecting a proper vacuum seal. The cure cycle, as previously described, is then accomplished.

The above-described seal assembly 16 has been found to be reusable for at least 50 cure cycles at 350° F. without any degradation. The fiberglass fabrics 20 and 24 are easily separated and cleaned for reuse. As a result of the above, the use of this sealing assembly 16 has significantly reduced the cost per cure cycle.

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

Industrial Applicability

This sealing system is used in the construction of a rapid, effective seal for silicone rubher vacuum bags. Silicone rubber vacuum bags using this sealing system can be used in the curing of a myriad of composite structures; conventional reinforced fiberglass structures, sandwich structures, and metal bonding applications. This vacuum bag sealing system is equally suited for curing of parts by vacuum bag/vacuum pressure/oven cures; vacuum bag/autoclave pressure/autoclave cures; and self contained, integrally heated tooling applications.

We claim:

1. A sealing system for the forming of structures and the like in a mold comprising:
   a base plate for mounting the mold;
   a first Teflon coated sealing surface bonded to said base plate extending about said mold;
   a vacuum bag;
   a second Teflon coated sealing surface bonded to said vacuum bag in a complimentary relationship to said first sealing surface when said vacuum bag is placed over said mold and said base plate; and
   adhesive means for detachably sealing said first sealing surface to said second sealing surface so that an airtight seal is formed between said vacuum bag and said base plate.

2. The sealing system of claim 1 wherein said vacuum bag is silicone rubber.

3. The sealing system of claim 2 wherein said first and second sealing surfaces are Teflon coated fiberglass fabric.

4. The sealing system of claim 2 wherein said first sealing surface is a Teflon coated fiberglass fabric and said second sealing surface is a Teflon pressure-sensitive tape.

5. The sealing system of claims 3 or 4 wherein said adhesive means is a silicone rubber adhesive.

6. The sealing system of claims 3 or 4 wherein said adhesive means is an acrylic pressure-sensitive adhesive.

7. The sealing system of claims 3 or 4 wherein said first and second sealing surfaces are substantially 5 mil. in thickness.

8. The sealing system of claims 3 or 4 wherein a silicone rubber adhesive is used to bond said second sealing surface to said vacuum bag.

9. A sealing system for detachably joining silicone rubber components to metal comprising:
   a first Teflon coated sealing surface bonded to the metal;
   a second Teflon coated sealing surface bonded to the silicone rubber component; and
   adhesive means for detachably joining said first sealing surface to said second sealing surface.

10. The sealing system of claim 9 wherein said first and second sealing surfaces are Teflon coated fiberglass fabric.

11. The sealing system of claim 9 wherein said first sealing surface is a Teflon coated fiberglass fabric and said second sealing surface is a Teflon pressure-sensitive tape.

12. The sealing system of claims 10 or 11 wherein said adhesive means is a silicone rubber adhesive.

13. The sealing system of claims 10 or 11 wherein said adhesive means is an acrylic pressure-sensitive adhesive.

14. The sealing system of claims 10 or 11 wherein said first and second sealing surfaces are substantially 5 mil. in thickness.

* * * * *